3,148,942
CALCIUM HYDROXY CYANATE
James Hayden Walker, Pinole, and Walter William Hanneman, El Cerrito, Calif., assignors to California Research Corporation, San Francisco, Calif., a corporation of Delaware
No Drawing. Filed Apr. 23, 1962, Ser. No. 189,316
3 Claims. (Cl. 23—75)

This invention relates to a novel chemical compound, calcium hydroxy cyanate.

Calcium hydroxy cyanate is prepared by reacting urea and calcium hydroxide at temperatures up to 160° C., preferably, in the presence of a liquid medium which does not react with calcium hydroxide or with urea at temperatures in the range about 120 to 150° C. The more preferred range is from 120–140° C. because of the quality of product and readily available refluxing materials.

As starting material, industrial grade urea is suitable. The use of urea of higher purity facilitates production of high purity calcium hydroxy cyanate.

Preferably, the calcium hydroxide starting material should be in finely divided form. If coarse granules are used, the rate of reaction is reduced.

Normally, liquid hydrocarbons are suitable liquid reaction media. Hydrocarbons boiling in the range of from 120 and up to 140° C. are especially suitable, they are inert to the reactants and can be refluxed at atmospheric pressure to maintain a suitable reaction temperature and facilitate the removal of water and ammonia formed during the reaction from the reaction zone. The xylenes are especially suitable materials.

The progress of the reaction may be monitored by following the rate at which either water or ammonia are expelled from the reaction zone.

A typical preparation of calcium hydroxy cyanate is illustrated in the following example.

EXAMPLE

One mol of urea (60.1 g.), one mol of calcium hydroxide (74.1 g.), and 500 ml. of xylene are introduced into a flask fitted with a reflux condenser and water trap. After six hours refluxing the evolution of ammonia ceased, 18 ml. of water were collected in the water trap. The contents of the flask were filtered, recovered and dried in a vacuum oven for three hours at 114° C. The weight of the dry white solid was 100.8 g.

Elementary analysis gave the following results:

|  | Percent |
|---|---|
| Calcium | 38.6 |
| Nitrogen | 11.6 |
| Hydrogen | 1.46 |
| Carbon | 11.56 |

These figures depart slightly from theory because of the presence of minor amounts of calcium carbonate, calcium hydroxide and water of crystallization in the solid.

The product was analyzed by means of infrared spectroscopy, and it showed absorption peaks at 875 cm.$^{-1}$ and 2200 cm.$^{-1}$. These are characteristics of the

O—C=N— group which has bands recorded at 870 cm.$^{-1}$ and 2170 cm.$^{-1}$. An absorption peak attributable to an oxygen hydrogen bond is also present. Calcium hydroxy cyanate is a white powder having low water solubility and giving an alkaline reaction. An X-ray diffraction pattern showed the presence of previously unidentified lines of a new compound and lines due to small amounts of impurities. The new lines are as follows.

| d, Angstroms: | Intensity |
|---|---|
| 6.75 | 53 |
| 4.57 | 49 |
| 3.20 | 100 |
| 2.967 | 47 |
| 2.895 | 25 |
| 2.811 | 10 |
| 2.250 | 45 |
| 1.948 | 25 |
| 1.871 | 16 |
| 1.796 | 10 |
| 1.743 | 10 |
| 1.637 | 10 |
| 1.583 | 8 |

Calcium hydroxy cyanate is useful as a herbicide, soil conditioner and fertilizer.

It has been found that calcium hydroxy cyanate, because of its low water solubility, provides available plant nitrogen in controlled amounts. The nitrogen comes from the cyanate portion of the molecule. Furthermore, it gives an alkaline reaction, and, thus, conditions the soil by counteracting its acidity. As a postemergent drench herbicide, the calcium hydroxy cyanate compares favorably with 2,4-D, and is considerably less expensive. Thus, the compound of the invention presents an ideal combination of fertilizer, soil conditioner and herbicide.

Calcium hydroxy cyanate was compared with 2,4-D as a postemergent drench on both broad leaf plants and grasses. The results have been summarized in the following table, both compounds were used at a concentration of 100 p.p.m., and the kill in percent of the total amount of grass.

Table

| Plants | Percent Kill | |
|---|---|---|
|  | Basic Calcium Cyanate | 2,4-D |
| Mustard (Brassica negra) | 97 | 100 |
| Artichoke Thistle (Cynara cardunculus) | 99 | 100 |
| Orchard Grass (Dactylis glomerata) | 69 | 99 |
| Bermuda Grass (Cynodon dactylon) | 85 | 100 |

We claim:
1. Calcium hydroxy cyanate.
2. The process of preparing calcium hydroxy cyanate which comprises refluxing urea and calcium hydroxide in an inert liquid medium which boils in the range of about 120° C. to 140° C.
3. The process of preparing calcium hydroxy cyanate according to claim 2, wherein said inert liquid medium is xylene.

References Cited in the file of this patent
UNITED STATES PATENTS
2,801,154    De Pree et al. _____ July 20, 1957

FOREIGN PATENTS
796,637    Great Britain _____ June 18, 1958